Figure 1:
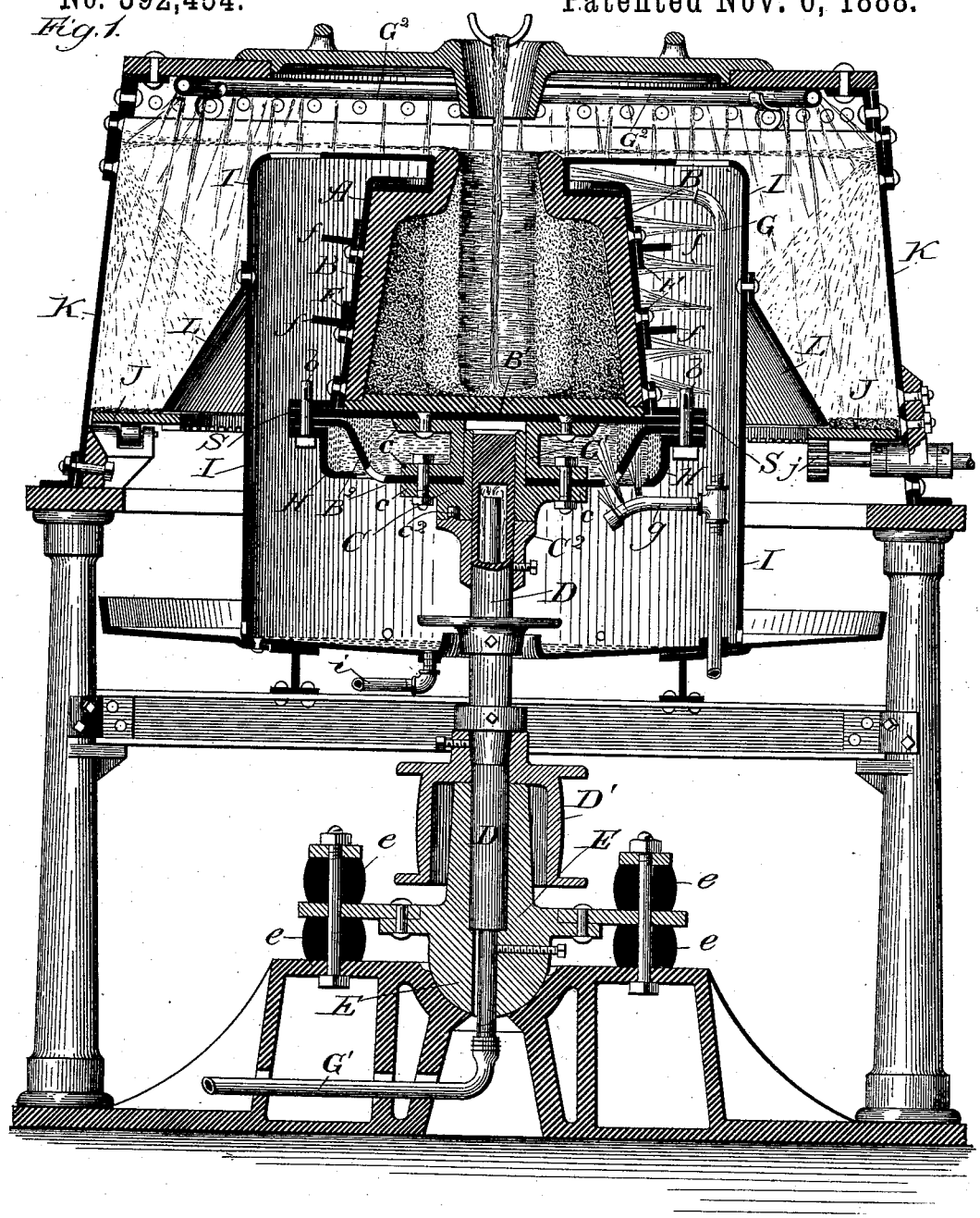

(No Model.) 2 Sheets—Sheet 1.

O. B. PECK.
APPARATUS FOR TREATING MOLTEN SLAG OR MATERIAL FROM SMELTING FURNACES.

No. 392,454. Patented Nov. 6, 1888.

Witnesses:
Chas. E. Gaylord.
Clifford L. White.

Inventor:
Orrin B. Peck,
By Banning & Banning & Payson
Attys.

N. PETERS, Photo-Lithographer, Washington, D. C.

(No Model.) 2 Sheets—Sheet 2.
O. B. PECK.
APPARATUS FOR TREATING MOLTEN SLAG OR MATERIAL FROM SMELTING FURNACES.
No. 392,454. Patented Nov. 6, 1888.
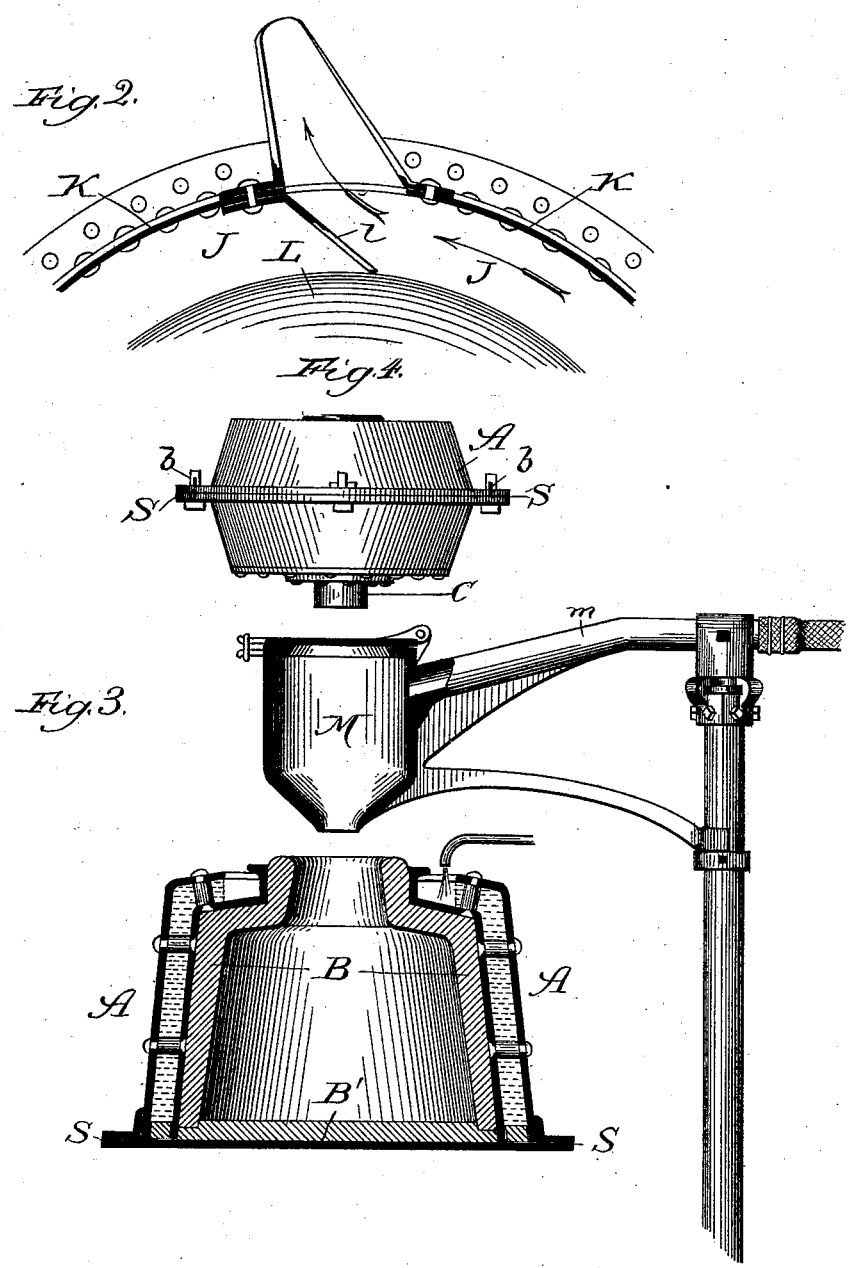
Witnesses:
Chas. E. Gaylord.
Clifford N. White.
Inventor:
Orrin B. Peck,
By Banning & Banning & Payson,
Att'ys

UNITED STATES PATENT OFFICE.

ORRIN B. PECK, OF CHICAGO, ILLINOIS, ASSIGNOR TO THE AMERICAN SLAG FURNACE COMPANY, OF SAME PLACE.

APPARATUS FOR TREATING MOLTEN SLAG OR MATERIAL FROM SMELTING-FURNACES.

SPECIFICATION forming part of Letters Patent No. 392,454, dated November 6, 1888.

Application filed September 11, 1888. Serial No. 285,158. (No model.)

*To all whom it may concern:*

Be it known that I, ORRIN B. PECK, a citizen of the United States, residing at Chicago, Illinois, have invented certain new and useful Improvements in Apparatus for Treating Molten Slag or Material from Smelting-Furnaces, of which the following is a specification.

The object of my invention is to make an apparatus for treating molten slag and other material from smelting furnaces to separate the metal, matte, and other substances of value from their molten slag by the action of centrifugal force; and my invention consists in the features and details of construction hereinafter described and claimed.

In the drawings, Figure 1 represents a side elevation of a vertical section of my apparatus. Fig. 2 is a plan view of a portion of a slag-removing table. Fig. 3 is a side elevation of a vertical section of a slag-receiving vessel with double walls, together with means for supplying heat to the same as desired; and Fig. 4 is a side elevation of a slag-receiving vessel of modified form.

In making my improved apparatus for treating molten slag or material from smelting-furnaces to separate the metal and other substances of value from the slag, I make a slag-receiving vessel, A, with an opening at the top, of boiler-iron or other metal capable of being revolved at a high speed and of resisting a powerful internal pressure. This vessel is preferably provided with a cast-iron lining, B, made with an external form to fit the interior of the vessel A. The lining when in place is intended to be revolved with the vessel A. Both the vessel and its lining are made separable in horizontal planes in two or more parts, and are preferably formed with a greater internal diameter at the point of separation or near thereto, so that they will taper or incline slightly toward the plane of separation. This construction will enable the vessel to be taken apart and the solidified or partially-solidified slag to be easily removed or slid out. As shown in some of the figures of the drawings, the lower end is made with a greater diameter, and this is the form which I prefer. When made in this form, the lower or larger ends of both vessels are made open, so that a bottom or end piece, which in such case forms one of the parts of the separable vessel, can be fitted to them to be removed as occasion may require. As shown in Fig. 1, the removable ends B' are keyed in place by keys $b$.

The bottom or end of the slag-receiving vessel proper, by which I mean the external shell, is preferably provided with a supplemental piece, $B^2$, which bulges or extends down somewhat below the bottom proper and affords additional means for fastening the slag-receiving vessel to a spindle or shaft on and with which it revolves. To effect its connection with such spindle or shaft, I make a collar, C C', preferably of two parts, provided with a hole in which the end of the spindle or shaft may be inserted. This collar is provided with flanges $c$, to enable it to be riveted or bolted to the bottom proper of the slag-receiving vessel and to the supplemental bottom $B^2$, as shown in Fig. 1. A vertical shaft or spindle, D, is provided with suitable bearings to give it the necessary support and maintain it in its proper position and to permit it to be revolved by means of a belt and pulley, D'.

The collar C C', which, as above stated, is riveted to the bottom and supplemental bottom of the slag-receiving vessel, is fastened to the shaft D when in place, so as to revolve therewith. I have shown it as fastened by means of a supplemental collar, $C^2$, fixed to the shaft by means of a set-screw, and connecting with the collar C C' by means of an upward-projecting stud, $c^2$. This arrangement, while causing the slag-receiving vessel to revolve with the shaft D, enables it to be lifted off for any purpose, and particularly for the purpose hereinafter described.

The shaft D is preferably supported in a flexible mounted bearing, E, supported laterally by cushions of rubber or other slightly-yielding material, so that as the shaft D with the slag-receiving vessel revolves the vessel may adjust itself to a true center. The slag-receiving vessel is preferably re-enforced or strengthened by hoops F, provided with outwardly-extending flanges $f$. The object of having these flanges on the hoops is to enable them to be the more readily kept cool or at a low temperature by spraying them with water, as hereinafter described. As the object of these hoops is to strengthen the slag-receiving vessel, they may be dispensed with if the vessel be made sufficiently strong; but even when they are dispensed with I prefer to provide the vessel with outwardly-extending flanges or ribs to enable me to keep it at a low temperature, as above said. These ribs are of themselves more readily kept cool or at a low temperature than the flat surface of the vessel, which is in closer contact with the source of heat, and so will themselves greatly strengthen the slag-receiving vessel.

I provide means, as shown in Fig. 1, for spraying the exterior of the slag-receiving vessel with water or wet steam to keep it cool when in operation or to prevent it from becoming overheated by the heat of the molten slag, and to this end and as one of the means that may be employed to cool the slag-receiving vessel, though others may be used, I have shown a pipe, G, through which water or steam may be forced, and which is provided with a number of openings to enable the water or steam in small streams or jets to be directed against the side of the slag-receiving vessel. A branch, $g$, is preferably extended under the vessel, with holes or perforations on its upper side, so that the water or steam will be directed against the bottom of the vessel. The supplemental bottom $B^2$ is provided with holes to enable the water to pass between it and the bottom proper of the vessel, as shown in Fig. 1, and fill or partially fill the space between them, and to more effectually secure the benefit of the spray from the pipe $g$, I prefer to provide a flange, H, which is secured to the bottom of the vessel and operates to assist in retaining the water thrown from the pipe $g$. If desired, similar cups or flanges can be arranged around the slag-receiving vessel. As the bottom or part of the slag-receiving vessel where it is keyed or fastened together by the keys $b$ extends out some distance beyond the sides of the slag-receiving vessel, (shown at S,) it affords additional means for keeping the vessel cool and the water will act on it as in the case of the flanges or rib $f$.

To keep the spindle or shaft D cool while revolving and in operation, I prefer to make it hollow and to run a pipe, G', up it, as shown in Fig. 1, through which a stream of water may be forced, emerging at the top and flowing down through the shaft and escaping at the bottom, though other means of supplying the shaft with water may be employed, if desired.

The slag-receiving vessel is preferably surrounded by a curb, I, which catches the water spraying onto the slag-receiving vessel, and through which it may be carried off by the pipe $i$ as it accumulates in the bottom. The bottom of this curb is preferably extended and turned up at the outer edges, as shown in Fig. 1, so as to receive any water that may pass down upon it from that used to spray or cool the slag, as hereinafter described. The water thus dripping or falling onto the extended bottom flows into the curb through holes, as shown, whence it is carried off through the pipe $i$. Around the curb I is provided a slag-removing table, J, which is intended to entirely surround the curb and to be constantly rotated by means of a row of teeth on its bottom and a pinion, $j$, which may be rotated in any desired manner. Around this slag-removing table is provided another curb, K, or wall to receive the slag as it is discharged out of the top of the slag-receiving vessel, as hereinafter described, and cause it to fall down upon the slag-removing table. A hood, L, is also preferably provided around the curb I to assist in directing the slag upon the removing table. As the table revolves, the slag accumulating on it is carried around until it reaches a scraper, $l$, which extends obliquely across the table and directs the slag into a spout opening or exit, whence it falls into a convenient vessel or receptacle to permit of its removal. As it is discharged and falls on the removing table J, jets or sprays of water or wet steam from the pipe $G^2$ are preferably directed upon it and upon the wall or curb K to cool the slag or reduce its temperature and to prevent the curb or wall from becoming overheated by the heat of the molten slag. Of course it will be understood that the slag-receiving vessel is supported upon suitable standards or frame-work, so as to permit all of the parts to operate and perform their intended office.

In Fig. 3 I have shown the slag-receiving vessel somewhat modified. I have provided it with double walls with an annular space between them, so that a stream of water or wet steam may be directed into such space, and thus prevent the slag-receiving vessel from becoming overheated, and as there will be occasions when there will be an interruption of the flow of the slag from the smelting-furnaces I have shown in Fig. 3 a pot or vessel, M, adapted to contain fuel and supported on a crane, so that it can be turned into a position immediately over the mouth of the slag-receiving vessel. A blast-pipe, $m$, leading from a force-blower or other means of creating a blast, enables me to drive a blast of air through the burning fuel in the pot M and into the slag-receiving vessel. By this means I can heat the interior of the slag-receiving vessel preparatory to receiving the first charge of molten slag and prevent it from becoming chilled or cooled when it is desirable to maintain its temperature at a high point until a second or other charge of slag is ready to be flowed into it.

In Fig. 4 I have represented the slag-receiving vessel as formed of parts which are of a greater diameter at the middle of the vessel, where they are fastened together, than at the ends, so that they can be connected at this point and enable the cooled or partially-cooled slag, which has in a measure become solidified, to be slid or dumped out of them when separated, and thus removed, as where the end of the vessel shown in Figs. 1 and 3 is detachable.

In operation the slag-receiving vessel through the means described above or similar means is caused to revolve at a very high speed. The higher the speed within the limits of safety the more rapid and perfect will be the results. As it is revolved it is preferably heated by the means shown in Fig. 3, so that it will be in good condition to receive the first charge of the molten slag from the smelting-furnace. After it has become sufficiently heated and has attained a sufficiently high speed in its revolutions, the molten slag is admitted through a spout or pipe, so as to fall, preferably, in the center of the slag-receiving vessel. As it strikes the bottom the centrifugal force produced by the revolution of the vessel will cause the particles of metal, matte, and other substances in the slag which are of greater specific gravity than the slag proper to fly to the outer edge of the slag-receiving vessel. The slag itself, thus separated from the metal, will flow upward around the central portion of the vessel until it reaches the top, where it will be discharged and fly off at a tangent, as shown in Fig. 1, until it strikes the curb K, when it will be thrown back and fall on the slag-removing table. After a sufficient quantity of slag has been operated upon to fill the slag-receiving vessel as far as practical with the metal, matte, and other substances which have been separated in most part from the slag, the slag-receiving vessel can be removed by lifting it off from the shaft or spindle D and emptied in a convenient receptacle for further smelting. As this action is continued a certain quantity of the metal will become more or less solidified around the side of the vessel, so that it cannot be poured out. After this solidifying has proceeded until it begins to interfere with the action, the bottom of the slag-receiving vessel may be detached or the vessel separated at the line of separation provided and the partially-solidified mass allowed to slide out into the vessel or receptacle for receiving the metal for further smelting. The vessel may then be put together and the action continued until it has again accumulated around the sides of the vessel, when it may be again removed, as above described.

I have found that the particles of metal, matte, and other substances of value which now pass off with the slag and are to a great extent lost can be in most part separated from the slag and saved, so as to be submitted to further smelting, by which most of the metal and other substances of value of any given ore can be obtained. This desirable result I have found can be secured by the employment of the apparatus and means above described; but as the essence of my invention consists in the employment of an apparatus in which a slag-receiving vessel may be revolved at a high speed, and yet its exterior kept at a sufficiently low temperature for practical work while receiving and operating upon a material containing the intense heat of molten slag, and which permits such portion of the slag as becomes partially cooled or solidified therein to be removed or slid out by the separation of the vessel, I do not desire to confine myself to all the details of construction, as various modifications will readily suggest themselves without departing from the essential features of my invention.

I shall not herein claim the process of treating the slag of metals while in a molten condition to the action of centrifugal force to remove the metal, matte, and other substances of value from the slag, as I make that the subject of another application.

What I regard as new, and desire to secure by Letters Patent, is—

1. In an apparatus for separating metal and other substances from molten slag, the combination of a revoluble slag-receiving vessel, means for revolving the same, and means for cooling the exterior of the slag-receiving vessel while containing molten slag, by which means the metal and other substances may be separated from the molten slag by the action of centrifugal force, substantially as described.

2. In an apparatus for separating metal and other substances from molten slag, the combination of a revoluble slag-receiving vessel separable in the plane of its largest diameter and having its interior sloped or inclined toward such plane, whereby solidified or partially-solidified slag may be removed on the separation of the vessel, means for revolving the slag-receiving vessel, and means for cooling the exterior of such vessel, substantially as described.

3. In an apparatus for separating metal and other substances from the molten slag, the combination of a revoluble slag-receiving vessel separable in the plane of its largest diameter and having its interior sloped or inclined toward such plane, a lining for such vessel having its exterior of a size and shape to fit the interior of the covering-shell and correspondingly separable, whereby solidified or partially-solidified slag may be removed on the separation of the vessel, means for cooling the exterior of such vessel, and means for revolving the slag-receiving vessel, substantially as described.

4. In an apparatus for separating metal and other substances from molten slag, the combination of a revoluble slag-receiving vessel separable in the plane of its largest diameter and having its interior sloped or inclined toward such plane, a lining for such vessel having its exterior of a size and shape to fit the interior of the covering-shell and correspondingly separable, whereby solidified or partially-solidified slag may be removed on the separation of the vessel, means for cooling the exterior of the slag-receiving vessel while containing molten slag, and means for revolving the slag-receiving vessel, substantially as described.

5. In an apparatus for separating metal and other substances from molten slag, the combination of a revoluble slag-receiving vessel consisting of a shell and a lining thereto adapted to receive molten slag and having its exterior of a size and shape to fit the interior of the shell, means for cooling the exterior of the slag-receiving vessel while containing molten slag, and means for revolving the slag-receiving vessel, substantially as described.

6. In an apparatus for separating metal and other substances from molten slag, the combination of a revoluble slag-receiving vessel, means for cooling the exterior of the slag-receiving vessel while containing molten slag, projecting flanges or ribs extending out from the exterior of such vessel, and means for revolving such vessel, substantially as described.

7. In an apparatus for separating metal and other substances from molten slag, the combination of a revoluble slag-receiving vessel, means for revolving the same, and means for cooling the slag as it is discharged from the top of the slag-receiving vessel by the action of centrifugal force, substantially as described.

8. In an apparatus for separating metal and other substances from molten slag, the combination of a revoluble slag-receiving vessel, a curb against which the slag is thrown as it is discharged from the top of the slag-receiving vessel by the action of centrifugal force, and means for preventing such curb from becoming overheated by the heat of the molten slag, substantially as described.

9. In an apparatus for separating metal and other substances from molten slag, the combination of a revoluble slag-receiving vessel having an outer and an inner shell with an annular space between them, means for revolving such slag-receiving vessel, and means for introducing water or wet steam into the annular space between the walls of the slag-receiving vessel, whereby the same is prevented from becoming overheated by the heat of the molten slag, substantially as described.

10. In an apparatus for separating metal and other substances from molten slag, the combination of a revoluble slag-receiving vessel, means for revolving the same, a rotating slag-removing table receiving the slag as it is discharged from the top of the slag-receiving vessel by the action of centrifugal force and carrying it to an opening or exit, means for scraping the slag from the table and directing it into the opening or exit, and means for rotating the slag-removing table, substantially as described.

ORRIN B. PECK.

Witnesses:
 HATTIE FARNHAM,
 THOMAS A. BANNING.